United States Patent [19]
Hart

[11] Patent Number: 6,108,458
[45] Date of Patent: *Aug. 22, 2000

[54] SPARSE ARRAY IMAGE CORRELATION

[75] Inventor: Douglas P. Hart, Newton Center, Mass.

[73] Assignee: Massachusetts Institute of Technology, Cambridge, Mass.

[*] Notice: This patent is subject to a terminal disclaimer.

[21] Appl. No.: 09/211,535

[22] Filed: Dec. 15, 1998

Related U.S. Application Data

[63] Continuation of application No. 08/675,718, Jul. 3, 1996, Pat. No. 5,850,485.

[51] Int. Cl.$^7$ ............ G06K 15/316; G06K 9/00; G01P 3/36
[52] U.S. Cl. ............ 382/278; 382/107; 356/28
[58] Field of Search .................... 382/278, 103, 382/107; 364/560, 561, 528, 604, 728.03, 819; 395/2.25, 2.27; 356/28; 348/413, 416

[56] References Cited

U.S. PATENT DOCUMENTS

| | | | |
|---|---|---|---|
| 4,616,333 | 10/1986 | Shimani | 364/819 |
| 4,729,109 | 3/1988 | Adrian et al. | 364/560 |
| 4,792,231 | 12/1988 | Fried | 356/54 |
| 4,866,639 | 9/1989 | Adrian | 364/525 |
| 4,922,915 | 5/1990 | Arnold et al. | 382/128 |
| 4,988,191 | 1/1991 | Adrian et al. | 73/861.06 |
| 5,011,278 | 4/1991 | Farrell | 73/861.06 |
| 5,051,904 | 9/1991 | Griffith | 364/413.16 |
| 5,440,144 | 8/1995 | Raffel et al. | 356/28 |
| 5,491,642 | 2/1996 | Wormell et al. | 364/509 |
| 5,581,383 | 12/1996 | Reichel et al. | 382/278 |
| 5,610,703 | 3/1997 | Raffel et al. | 356/28 |

OTHER PUBLICATIONS

Adrian, R. J., Particle Imaging Techniques for Experimental Fluid Mechanics, *Annual Review of Fluid Mechanics*, vol. 23, pp. 261–304 (1991).

Zhou, C. et al., "Fast Method of Correlation Measurement of Planar Particle Fields," *Electronics Letters*, (Sep, 28, 1995).

Westergaard, C. H., and Buchhave, P., "PIV: Comparison of Three Autocorrelation Techniques," Laser Anemometry Advances and Applications, *Proc. Fifth International Conference, the Netherlands*, pp. 535–541 (Aug. 23–27, 1993).

"A Class of Algorithm for Fast Digital Image Registration", Barnea, D. I. et al., IEEE Transactions on Computers, vol. 21, pp. 179–186 (1972).

"Particle–Imaging Techniques for Quantitative Flow Visualization—A Review", S. Kurda, et al., Optics and Laser Technology, vol. 25, p. 219 (1993).

"Video Recording and Quantitative Analysis of Seed Particle Track Images in Unsteady Flows", Marko, K.A., et al., Applied Optics, vol. 24, p. 3666 (1985).

*Primary Examiner*—Thomas D. Lee
*Assistant Examiner*—Wenpeng Chen
*Attorney, Agent, or Firm*—Hamilton, Brook, Smith & Reynolds, P.C.

[57] ABSTRACT

A method of image correlation includes providing one or more image arrays of pixel values wherein each pixel value is associated with one of a number of pixels. Pixel values in the image array which are beyond a pixel threshold value are selected and a correlation process is performed on the selected pixel values. The correlation process is preferably performed according to an error correlation function. The sparse array correlation process provides several orders of magnitude in increased processing speed over known correlation processing techniques and is useful for Particle Image Velocimetry analysis.

11 Claims, 5 Drawing Sheets

SPARSE ARRAY IMAGE CORRELATION

This is a continuation of application Ser. No. 08/675,718, filed on Jul. 3, 1996, now U.S. Pat. No. 5,850,485, published on Dec. 15, 1998.

BACKGROUND OF THE INVENTION

Devices which rely on machine vision such as robotic and manufacturing equipment, image based measurement equipment, topographical mapping equipment, and image recognition systems often use correlation of a single image (auto-correlation) or correlation between multiple images (cross-correlation) to establish the size, shape, speed, acceleration and/or position of one or more objects within a field of view.

Particle image velocimetry (PIV) uses autocorrelation or cross-correlation to analyze flow characteristics in fluids. PIV is a flow measurement technique that provides quantitative, two-dimensional information of a flow velocity field. For general background information regarding PIV, see Adrian, R. J., "Particle Imaging Techniques For Experimental Fluid Mechanics", Annual Review of Fluid Mechanics, vol. 23, pp. 261–304 (1991). Unlike more traditional instruments such as hot-wire and laser-Doppler anemometery which are single-point measurement techniques, PIV is able to reveal the instantaneous spatial structures in a flow. Because of the high-resolution of information that can be obtained by PIV, determination of flow quantities such as vorticity and deformation are obtainable.

Until recently, PIV has been limited to applications in which two-dimensional, instantaneous velocity measurements are of interest. Holographic Particle Image Velocimetry (HPIV) and Stereoscopic PIV (SPIV) are being developed for quantitatively measuring three-dimensional flow velocity fields and for resolving unsteady flow structures. The usefulness of these techniques, however, is hindered by the present ability to analyze the enormous quantities of data in a reasonable time period.

Image correlation is typically performed using Fast Fourier Transforms (FFTs), image shifting, or optical transformation techniques. These techniques, although accurate, require extensive processing of the images in hardware or software. For an image having N×N pixels, for example, FFT techniques require on the order of $N^2 \log N$ iterations while image shifting techniques require $\Delta^2 N^2$ iterations, where $\Delta$ is the length of the correlation search in pixels. With either of these techniques, the image or a subsection of the image is fully (i.e. 100%) correlated regardless of the usefulness of the information content.

The optical transformation technique relies on the optical construction of the Young's fringes formed when a coherent light is passed through the image and then through Fourier transform optics. The resulting fringe pattern is digitized and analyzed by a computer. This is certainly the most elegant of the three methods and potentially the fastest. In practice, however, it has been found that it is difficult to detect the orientation of the Young's fringes.

SUMMARY OF THE INVENTION

In many machine vision and PIV applications, only a fraction of the image or images to be correlated actually contains useful information. That is, the number of pixels in the image or images having useful or pertinent values is few or sparse relative to the total number of image pixels. In accordance with the present invention, a process for correlating these images in a sparse array format retains only useful pixel values and uses only on the order of $\delta^2 \Delta^2 N^2$ processing iterations for an N×N pixel image, where $\delta$ is the fraction of the image containing pertinent pixel values. For most applications, $\delta$ is much less than 1. The sparse array correlation process of the present invention provides several orders of magnitude in increased processing speed over known correlation processing techniques in the majority of machine vision and PIV applications. High speed image correlation according to the present invention allows relatively inexpensive machine vision equipment to be used in applications for real time or near real time feedback control, measurement, and image recognition.

Accordingly, a method of image correlation includes providing one or more image arrays of pixel values wherein each pixel value is associated with one of a number of pixels. Pixel values in the full image array which are beyond a pixel threshold value are selected and a correlation process is performed on the selected pixel values. Preferably, each pixel value includes an intensity value and the pixel threshold value is a pixel intensity threshold value.

In the correlation process, a sparse image array of the selected pixel values and their respective locations in the full image array is created, wherein each pixel entry preferably defines location and value as a single word. Individual correlations are successively performed between all pixel entries in the sparse image array within a pixel distance of each other. The correlations are cumulated in a correlation table at respective distance entries.

Preferably, each individual correlation is performed according to an error correlation function. The error correlation function is of the form:

$$I_1 + I_2 - |I_1 - I_2|$$

where 1 and 2 represent relative sparse image array entries. Because the error correlation function uses integer addition and subtraction, the calculation is much faster than a statistical correlation value, $I_1 * I_2$, which requires integer multiplication. The use of the error correlation function has the added benefit of being significantly easier to implement in hardware without requiring a microprocessor.

According to another aspect of the invention, a correlation is performed on an image array which includes at least three images spaced at unequal time intervals. Possible relationships among the original pixels of the full image array are identified and the original pixels are reviewed to determine which relationship applies to yield the sign of direction.

DETAILED DESCRIPTION OF INVENTION

Particle Image Velocimetry is one of three closely related flow measurement techniques: PIV, Particle Tracking Velocimetry (PTV) and Laser Speckle Velocimetry (LSV). All of these techniques are based on seeding the flow with small tracer particles. The density and size of these particles are chosen so that they will accurately follow the motion of the fluid. The flow is then cut with a light sheet and an image is recorded of the tracer particles that fall within this light sheet. By imaging the flow at different times in this way, the motion of the particles and thus the motion of fluid can be observed. What distinguishes these techniques from one another is the density of particles, ($N_S$) and the image density ($N_I$) $N_S$ as denoted here is a dimensionless number which indicates whether the image consists of individual particle images ($N_S<<1$) or the particles overlap and light interference occurs ($N_S>>1$). $N_I$ is a dimensionless number indicating the number of particles present in the area of flow being interrogated.

In PTV, which is characterized by $N_S<<1$, $N_I1<<1$, the average distance between particles is much larger than the mean flow displacement between consecutive recorded images. This results in images which distinctly show the tracer particle displacements. This makes determining the flow velocity field relatively easy. However, since the image density is low, the resolution of the velocity information is severely limited.

In PIV, which is characterized by $N_S<<1$, $N_I>>1$, the density of particles is increased to improve the resolution of the velocity information extracted. Individual tracer particles can be observed in PIV images; however, because of the increased tracer particle density, it is difficult to distinguish the displacement of a single particle by simply viewing the image with the eye. A statistical correlation approach is required to accurately analyze these images.

In LSV, which is characterized by $N_S>>1$, $N_I>>1$, the density of tracer particles is further increased such that the particles begin to overlap in the image. Illuminated with a coherent light source, these particles form an apparent random interference pattern or speckle on the recorded image. This speckle pattern moves with the tracer particles in the flow and thus can be used to determine the velocity of the flow. These speckle images are analyzed in the identical way that PIV images are analyzed. Thus, there is little difference between this technique and PIV. While the resolution of the fluid velocity that can be determined with LSV is greater than PIV, the extremely high particle seeding densities of LSV can interfere with the flow being observed. In many cases, the resolution of PIV is more than adequate.

Techniques for recording PIV images fall into two categories: 1) multiple exposed images and 2) successive images, each of which is based on recording an image in the visible or near visible spectrum electronically with a CCD camera or chemically on film.

Multiple exposed image techniques involve either pulsing a light sheet to expose the tracer particles or using a solid-state shutter to expose the recording surface of a camera multiple times. The advantage of these techniques is that multiple exposures can be made at very high speeds using lasers and thus, high flow rates can be measured. The disadvantage to this technique is that the maximum density of particles that can be clearly imaged is reduced because individual particles are recorded on the same image multiple times.

Successive image techniques avoid the disadvantages of multiple exposure techniques by recording two separate images of the tracer particles at two different times. Only one image of the tracer particles is needed in each exposure so it is possible to record a high density of particles. This technique, however, is limited to slower flow applications because of the time it takes a camera to advance to the next image, i.e., the film advance rate for a standard camera and the rate at which the camera can be reset in the case of a CCD camera.

The purpose of PIV image analysis is to determine particle displacement by correlating the recorded images using any of the aforementioned methods: (1) image shifting, (2) digital Fourier transformation or (3) optical transformation.

One of the limitations in PIV technology is the time required to correlate a single PIV image. As higher image resolutions become available through improvements in electronic and chemical recording media, the need for high-speed image analysis becomes increasingly more important. With prior art techniques, a single PIV image can require several minutes to analyze. In order to resolve the formation of complex structures in a flow, hundreds and even thousands of images are needed. High-speed parallel processors can shorten the time required to obtain accurate flow measurements but it is still far slower than is desired. However, using the sparse array correlation of the present invention, these images can be processed at very high speeds.

Figure 1:
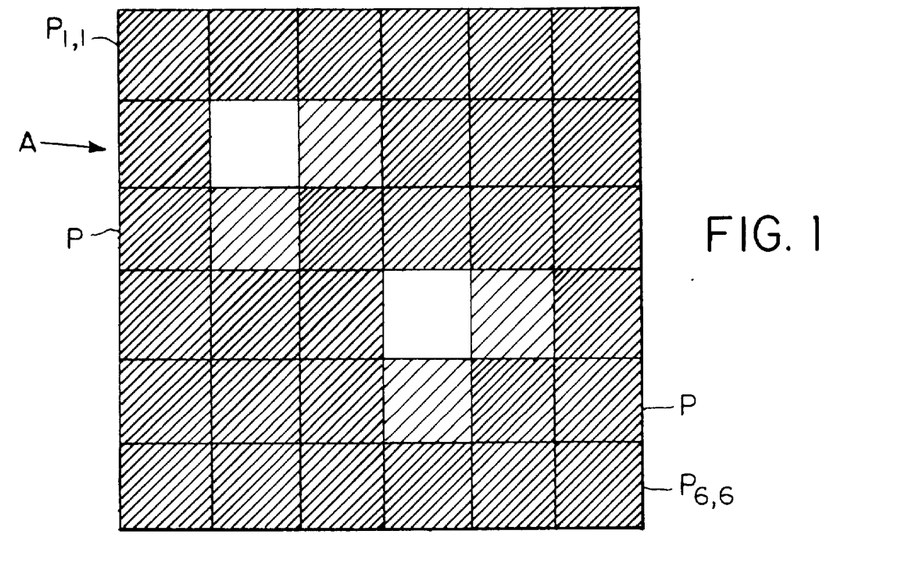
FIG. 1 is a diagrammatic representation of a 6×6 pixel grayscale image.
Figure 2:
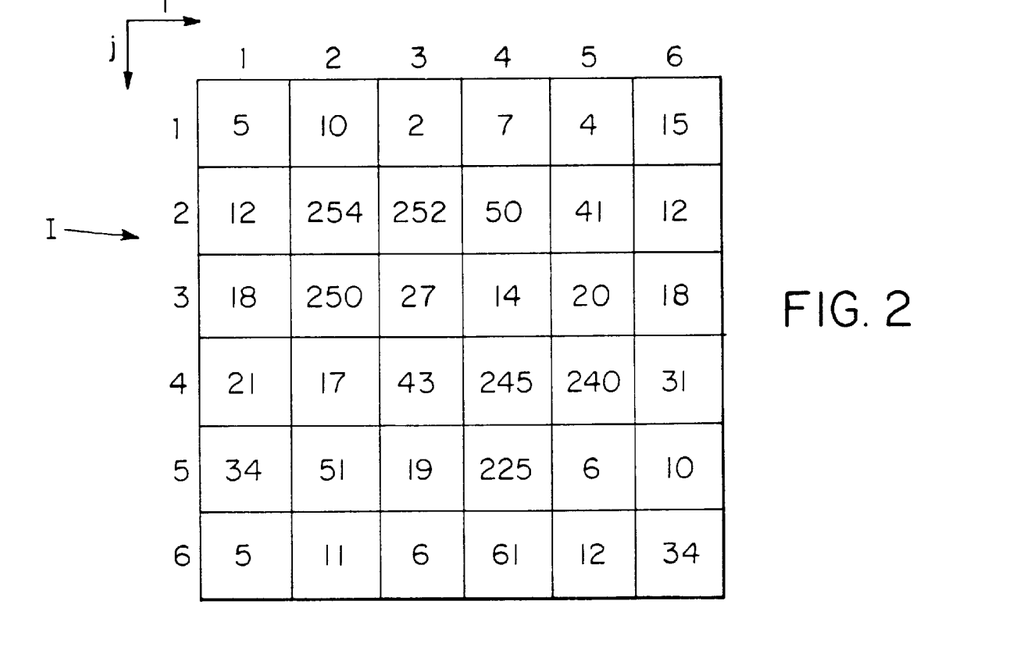
FIG. 2 is a two-dimensional image array of pixel intensity values corresponding to the image of FIG. 1.

To understand the improvement provided by the sparse array image correlation method of the present invention, it is useful to first review an example of the well-known image shifting autocorrelation technique. Referring to FIG. 1, a 6×6 pixel grayscale image representing a section of an image selected for autocorrelation is shown diagrammatically. The image, designated generally by reference A, comprises pixels designated by reference P. The number of pixels has been kept small for this example to simplify the figures and descriptions. However, the methods of the invention apply to any size image array. The image A is stored as a two-dimensional array I in a computer memory with pixel intensity values as array entries as shown in FIG. 2. For example, pixel $P_{1,1}$ of image A (FIG. 1) has a corresponding entry $I_{1,1}=5$. Likewise, pixel $P_{6,6}$ has a corresponding array entry $I_{6,6}=34$.

To increase processing speed while, at the same time, reducing the odds of obtaining spurious correlation values, the search for the maximum correlation is typically constrained. This is done by allowing the user to specify a maximum change in the image shift, $\Delta i$ and $\Delta j$, based on knowledge of the image being correlated. The correlation function, $\phi$, also referred to as the statistical correlation function, is calculated for this maximum change in the image shift. A maximum change of 3 in both the i and j directions is assumed for this example. The correlation function is calculated for each image shift, $\Delta i$ and $\Delta j$, using the function:

$$\phi_{\Delta i,\Delta j} = \frac{\sum_{m=1}^{M}\sum_{n=1}^{N}[I_{m+\Delta i,n+\Delta j} \cdot I_{m,n}]}{\sqrt{\sum_{m=1}^{M}\sum_{n=1}^{N}I_{m,n}^2} \cdot \sqrt{\sum_{m=1}^{M}\sum_{n=1}^{N}I_{m+\Delta i,n+\Delta j}^2}}$$

where M is the number of pixels in the ith direction of the image array and N is the number of pixels in the jth direction. The denominator normalizes the correlation values. The correlation table in the known image shifting technique is assembled sequentially using the above expression. This results in a significant amount of iterative calculations. For example, the array of FIG. 2 requires 440 such calculations to assemble the correlation table.

The correlation table entry for $(\Delta i, \Delta j)=(0,0)$, the zero shift correlation value, is:

$$\phi_{0,0} = \frac{\sum_{m=1}^{6}\sum_{n=1}^{6}[I_{m+0,n+0} \cdot I_{m,n}]}{\sqrt{\sum_{m=1}^{6}\sum_{n=1}^{6}I_{m,n}^2} \cdot \sqrt{\sum_{m=1}^{6}\sum_{n=1}^{6}I_{m,n}^2}} = 1.000$$

The zero shift correlation value equal to one represents perfect correlation.

From a visual inspection of the image A and the corresponding full image array I (FIGS. 1 and 2), an image shift around the value $(\Delta i, \Delta j)=(2,2)$ is of interest. Thus, the $(\Delta i, \Delta j)=(2,2)$ shift correlation value is:

$$\phi_{2,2} = \frac{\sum_{m=1}^{6}\sum_{n=1}^{6}[I_{m+2,n+2} \cdot I_{m,n}]}{\sqrt{\sum_{m=1}^{6}\sum_{n=1}^{6}I_{m,n}^2} \cdot \sqrt{\sum_{m=1}^{6}\sum_{n=1}^{6}I_{m+2,n+2}^2}} = 0.897$$

The portion of the correlation table around $(\Delta i, \Delta j)=(2,2)$ becomes as shown in Table 1, again using the expression for $\phi_{\Delta i, \Delta j}$ shown above:

TABLE 1

|  | Δi |  |  |
|---|---|---|---|
| Δj | 1 | 2 | 3 |
| 1 | 0.162 | 0.356 | 0.449 |
| 2 | 0.411 | 0.897 | 0.455 |
| 3 | 0.370 | 0.438 | 0.085 |

Once the correlation table is complete, a search can be performed to find the maximum value and its location, which is located at $(\Delta i, \Delta j)=(2,2)$ for this example. Subpixel resolution of the correlation can then be approximated by Newton's root finding method using the slope of the correlation based on the peak correlation and the values surrounding it and is of the form:

$$X=i-\{[\Phi_{i+1,j}-\Phi_{i-1,j}]/[2\cdot(\Phi_{i+1,j}-2\cdot\Phi_{i,j}+\Phi_{i-1,j})]\}$$

$$Y=j-\{[\Phi_{i,j+1}-\Phi_{i,j-1}]/[2\cdot(\Phi_{i,j+1}-2\cdot\Phi_{i,j}+\Phi_{i,j-1})]\}$$

where i,j here represent the array location of the peak value found in the correlation table.
Thus, $$X=2-(0.455-0.411)/(2\cdot(0.455-2\cdot0.897+0.411))=2.024$$

$$Y=2-(0.438-0.356)/2\cdot(0.438-2\cdot0.897+0.356))=2.041$$

The example image, therefore, autocorrelates at $(\Delta i, \Delta j)=(2.024, 2.041)$ based on the known image shifting autocorrelation technique.

Figure 3A:
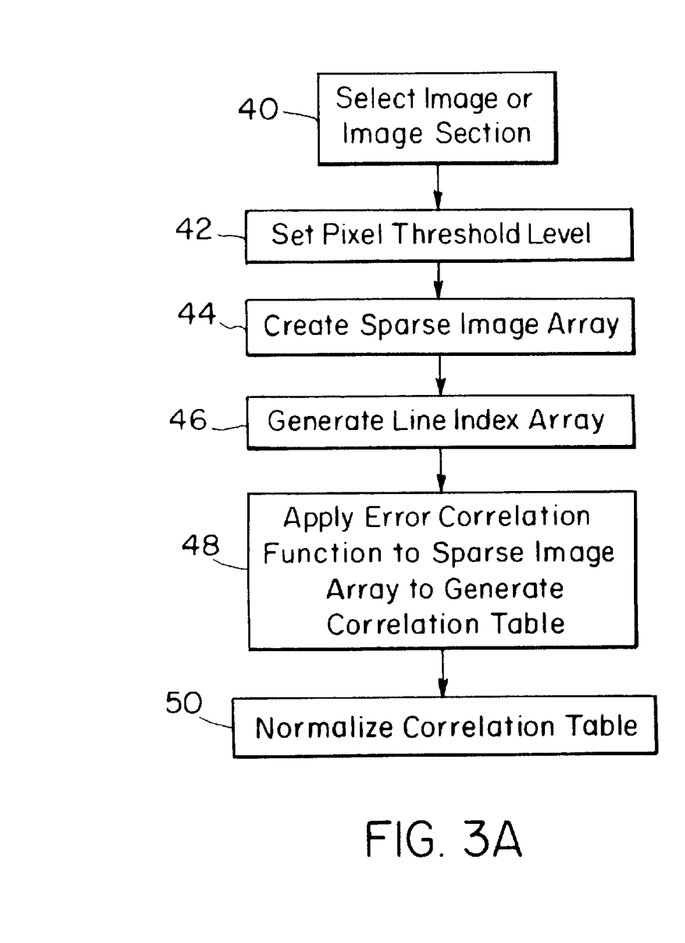
FIGS. 3A and 3B are flow diagrams of the sparse image array method of the present invention.
Figure 4:
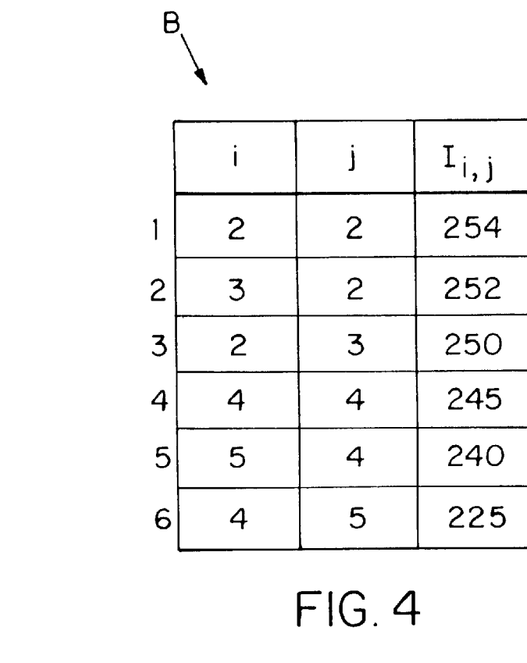
FIG. 4 is a two-dimensional sparse image array of selected pixel values of the image array of FIG. 2 in accordance with the present invention.

The sparse array image correlation method of the present invention will now be described. Referring to FIG. 3A, a flow diagram is shown of the sparse array image correlation method. An image or a section of an image is selected at step 40 for autocorrelation (FIGS. 1 and 2). By using sparse array correlation, however, the entire image need not be stored in memory. A threshold level is set at step 42 and only the pixel values that exceed the threshold level are retained in a sparse image array B at step 44 and as shown in FIG. 4. In the illustrative example, a threshold level of 100 is assumed. The sparse image array includes the location and intensity value of each selected pixel. The pixel location is denoted by the (i,j) indices of the pixel in the full image array I (FIG. 2).

In practice, the indices and intensity of each pixel in the sparse image array B are stored as a single word. This reduces the number of memory calls that must be made when correlating. For example, the first entry in this table can be stored as a 16 bit word: four bits for each location index and 8 bits for the intensity. The array entry i=2, j=2, I=254 becomes 0010001011111110 binary=8958. By masking the bits, the values of i, j, and $I_{i,j}$ can be extracted from this single entry.

Figure 5:
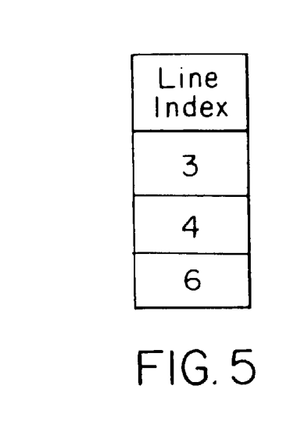
FIG. 5 is a one-dimensional line index array containing the locations of the next lines in the sparse image array of FIG. 4.

The entries into the sparse array are generated by scanning successive rows, or lines, of the full image array I. Along with the sparse image array, a line index array is generated at step 46 which contains the location in the sparse image array of the next line of the full image, i.e., the next higher value of j as shown in FIG. 5.

This line index array is used to jump to the next value of j in the sparse image array when a specified pixel separation is exceeded. Thus, the first entry, 3, indicates that the next higher value of j is found at entry number 3 of the sparse image array B (FIG. 4). When correlating large images, this index array speeds processing. For this example, however, the line index is not used.

Figure 6:
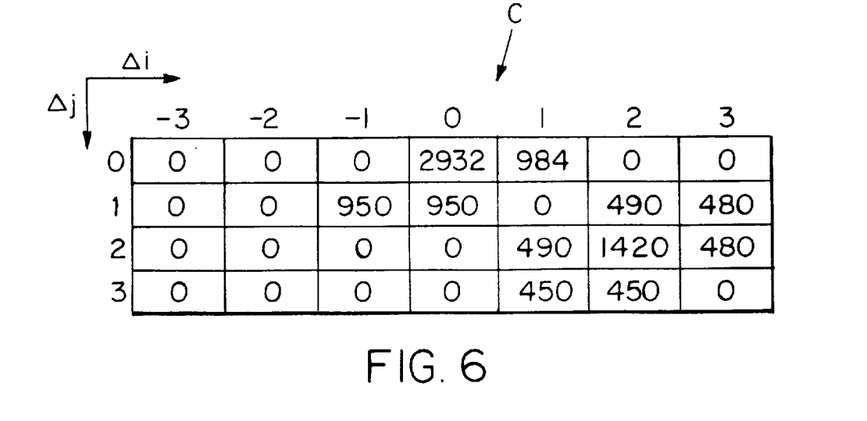
FIG. 6 illustrates a completed correlation table after a series of iterations through the sparse image array of FIG. 4.

An adaptive procedure could be used to narrow the correlation search by predicting the range of correlation values to calculate based on previous calculations from sub-windows of the same image. This procedure, however, is not particularly robust and can result in spurious errors in obtaining the maximum correlation. Because the sparse array correlation method of the present invention is inherently very fast, adaptive methods generally do not gain enough processing speed to warrant their use. It is sufficient to set a single value for the limit in correlation range for an entire image. In this example, a maximum change of Δ=3 in both i and j is assumed. Based on these values, a 7×4 correlation table C (FIG. 6) is generated at step 48 where the indices of this table, $(\Delta i, \Delta j)$, represent the difference in pixel locations. The sparse image array B is always correlated from the top down; therefore, both positive and negative differences are possible in the ith direction but not in the jth direction.

The correlation function that is used at step 48 in the method of the present invention is an error correlation function, $\phi'$, which can be expressed as, $$\phi'_{\Delta i,\Delta j} = \frac{\sum_{m=1}^{M}\sum_{n=1}^{N}[I_{m,n} + I_{m+\Delta i,n+\Delta j} - |I_{m,n} - I_{m+\Delta i,n+\Delta j}|]}{\sum_{m=1}^{M}\sum_{n=1}^{N}[I_{m,n} + I_{m+\Delta i,n+\Delta j}]}$$

such that, $$\phi'_{\Delta i,\Delta j} = 1 - \frac{\sum_{m=1}^{M}\sum_{n=1}^{N}[|I_{m,n} - I_{m+\Delta i,n+\Delta j}|]}{\sum_{m=1}^{M}\sum_{n=1}^{N}[I_{m,n} + I_{m+\Delta i,n+\Delta j}]}$$

The value of this correlation function ranges from 1 when the images are perfectly correlated to 0 when there is no correlation between the images. Although this correlation function is not equal to the usual statistical correlation function used in the image shifting example above, it has been found to introduce little error relative to other sources of error such as optical aberration in the image acquisition. Whereas the statistical correlation function yields a Gaussian function, the error correlation function yields a more steep function which has the advantage of more clearly delineating correlation peaks. Since the error correlation function uses integer addition and subtraction rather than multiplication, it is far faster to calculate than the statistical correlation function. This function has the added benefit of being significantly easier to implement in hardware without the need for a microprocessor.

Unlike the more common statistical correlation function, the error correlation function used in the sparse image correlation is not computed one correlation table entry at a time. Instead, the entire correlation table is derived by summing expressions as they are evaluated while iterating through the entries of the sparse image array B. This is shown in more detail later. In this way, array entries having pixel values below the set threshold are not processed, thus speeding overall processing.

It is difficult, however, to obtain the denominator in the correlation expression this way. The denominator, however, can be approximated as twice the sum of the pixel intensities in the image divided by the image area in pixels times the correlation table size:

$$\sum_{m=1}^{M}\sum_{n=1}^{N}[I_{m,n} + I_{m+\Delta i,n+\Delta j}] \cong 2\frac{(M-|\Delta i|)(N-|\Delta j|)}{M \cdot N}\sum_{m=1}^{M}\sum_{n=1}^{N} I_{m,n}$$

This approximation of the denominator provides an easily calculated normalization value without the need to sum all of the pixels in the image for each entry. The approximation is relatively accurate as long as the images being correlated are large compared with the correlation distance and the pixel intensities in the image are relatively evenly distributed. For images where this is not true, a statistical correlation function can be used in place of the error correlation function or the exact value of the denominator of the error correlation function can be calculated. It should be noted, however, that the correlation value of interest usually presents itself as a strong local maxima in the correlation table and that exact normalization of the correlation values has little effect on the results obtained. Because of this, normalization of the correlation values is often futile and correct results are obtained by assuming the denominator has a value of 1. In the example presented here, the denominator in the error correlation function is estimated. Because of the small size and the localization of the pixel values, the example image (FIG. 1) is a poor one to approximate the denominator. The approximation is, however, sufficient to illustrate the sparse array image method of the present invention.

Figure 3B:
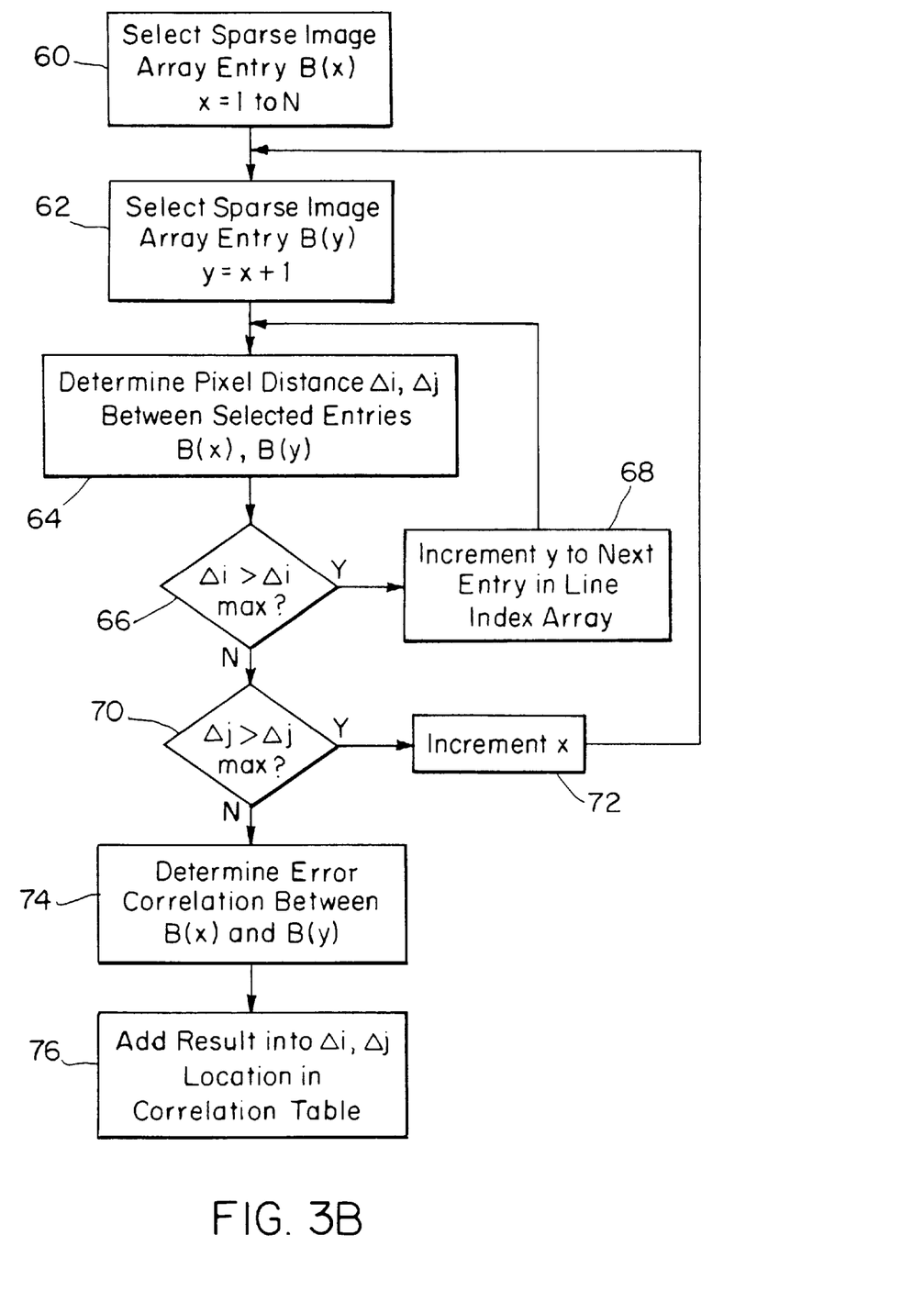

As noted previously, the error correlation function is applied to the sparse image array to generate the correlation table at step 48 (FIG. 3A). Referring now to FIG. 3B, a flow diagram is shown which provides details of the error correlation performed at step 48. In general, each entry in the sparse image array is compared with the entries below it and a correlation error estimation between the entries is added into the correct location in the correlation table. At step 60, an entry B(x) in the sparse image array is selected, where x=1 to N and B(1) is the first entry in the array. The next sparse image array entry below entry B(x) is selected at step 62 and this entry is denoted B(y) where y=x+1. At step 64, the pixel indices distance $\Delta i$, $\Delta j$ between the selected entries B(x) and B(y) is determined. If the distance is out of range of the specified correlation table size in the ith direction at step 66, the entry is ignored and processing continues with the next sparse image array entry specified by the line index array at step 68. If the location is out of range in the jth direction at step 70, the entry is ignored and a new series of iterations are made starting with the next sparse image array entry at step 72. If the pixel distance $\Delta i$, $\Delta j$ is within the specified correlation table size, then at step 74 the error correlation is determined between entries B(x) and B(y) as described heretofore. At step 76, the correlation result is cumulated into the correlation table location corresponding to the value of $\Delta i$, $\Delta j$.

As noted above, the sparse array image correlation is far faster than prior art techniques. The number of iterations for sparse array autocorrelation is given by the expression:

$$1/2\ \delta\Delta^2 \cdot (\delta N^2 - 1) + \delta N^2$$

When $\delta N^2 \gg 1$ and $\delta\Delta^2 \gg 1$, then the above expression can be approximated by $1/2\ \delta^2\ \Delta^2\ N^2$.

The number of iterations for sparse array cross-correlation is given by $\delta^2\ \Delta^2\ N^2$. N is the characteristic pixel length of the image being correlated and $\delta$ is the ratio of the number of pixels selected above the threshold to the total number of pixels in the full image. Variable length encoding, described hereinafter, reduces the computational intensity of the sparse array correlations by a factor which depends on the characteristics of the particular image being correlated.

Note that the total number of iteration steps to complete the correlation table is 21 in this example. Conventional image shifting algorithms require 818 iterations and limited shifting algorithms require 440 iterations as noted above. The best FFT algorithm would result in 28 iterations but would require extensive floating point calculations which are extremely slow to process. The gain in speed by using sparse array image processing on this example is roughly a factor of 20. Larger and more sparse images obtain significantly higher gains in speed with the method of the present invention.

Figure 7:
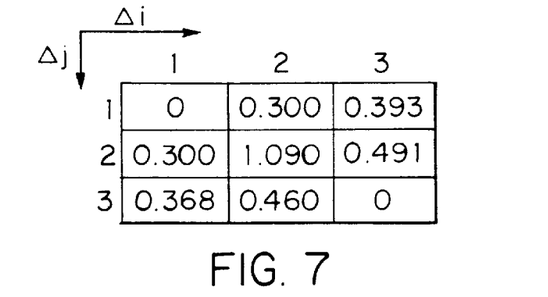
FIG. 7 illustrates the completed correlation table of FIG. 6 around $(\Delta i, \Delta j) = (2,2)$ wherein the values are normalized.

Once the correlation table is complete, it can be normalized at step 50 (FIG. 3A) based upon an approximation of the sum of the pixel intensity values. A search can be performed to find the maximum value and its location, which is at ($\Delta i$, $\Delta j$)=(2,2) in this example. The normalized correlation table around ($\Delta i$, $\Delta j$)=(2,2) becomes as shown in FIG. 7. Note the value at location (2,2) is greater than 1 due to error introduced by approximating the normalization factor. Using Newton's root finding method, the peak correlation is found at, $X=2-(0.491-0.300)/(2\cdot(0.491-2\cdot1.090+0.300))=2.069$ $Y=2-(0.460-0.300)/(2\cdot(0.460-2\cdot1.090+0.300))=2.056$ The example image, therefore, autocorrelates at $(\Delta i, \Delta j)=(2.069, 2.056)$ based on sparse array image autocorrelation using an error correlation function and approximating the normalization factor, as compared to (2.024, 2.041) in the known image shifting technique. This method gives $(\Delta i, \Delta j)=(1.997, 1.990)$ if the correlation values are not normalized. In general, normalization of the correlation function is wasteful of processing time because there is usually a strong local maxima and the sub-pixel resolution results are calculated from a one pixel region surrounding the local maxima in the correlation table. In the foregoing example, the correlation results are better if the table is not normalized due to errors introduced in approximating the normalization factor. In most applications, however, the normalized results and the non-normalized results are very close. In the foregoing example, the results are within 0.07 pixels of each other.

Further speed can be gained by variable-length encoding the image before thresholding and storing the image in a sparse image array. This is accomplished by combining adjacent pixels that have the same most significant bit (MSB) values into a single pixel value with length l where l equals the number of adjacent pixels, and an intensity I' equal to the average of the 8 bit intensity values of the combined pixels. The i, I' and l values of the combined pixels with intensities above the threshold are stored as a single value in the sparse image array rather than the i, j, and I values as presented above. The j value need not be stored because its value is implicit in the line index array. This is true in the non-variable-length encoded sparse image array as well, but with 32 bit integer values, there is room to store the j value in the sparse array itself if a pixel length value need not be stored.

The overall correlation processing remains unchanged as the variable-length values are treated in much the same way as pixel values. Note, however, that the i value that is stored is the location of the first pixel of the combined pixel set. The actual location of the pixel set in the ith direction is $[i+(l-1)/2]$. When calculating the correlation function, the length as well as the magnitude must be considered. For example, the error correlation between two pixels, $I_1+I_2-|I_1-I_2|$, becomes:

$$0.5[l_1+l_2-|l_1-l_2|]\cdot[I'_1+I'_2|I'_1-I'_2|]$$

and the correlation value $I_1 \cdot I_2$ becomes:

$$0.5\cdot[l_1+l_2-|l_1-l_2|]\cdot I'_1\cdot I'_2$$

The value, $0.5\cdot[l_1+l_2-|l_1-l_2|]$, is always an integer and equal to the shortest length. In practice, it is faster to simply compare the lengths $l_1$ to $l_2$ and multiply by the shortest.

Variable-length encoding effectively reduces the number of pixels that must be correlated without significantly distorting the original image. Because the number of calculations that must be made is proportional to the square of the number of pixels, variable-length encoded correlation usually results in a significant increase in processing speed.

The above example describes use of the present invention to autocorrelate an image or subimage, such as a PIV image recorded using multiple exposed images. The sparse array image correlation method can also be applied to cross-correlate two images A,A', such as successive PIV images. In the case of cross-correlation, sparse image arrays B,B' are generated which correspond to the images A,A'. In applying the error correlation function, each entry in the first sparse image array B is compared with the entries in the second sparse image array B' and a correlation approximation between the entries is added to the correlation table. Because an entry is compared to all entries in the opposing array, the correlation table has entries in the positive and negative directions for both $\Delta i$ and $\Delta j$.

As noted earlier, PIV image analysis is useful for determining velocity vectors in particle flow. One problem associated with recording PIV images using multiple exposures is that more than two exposures are needed to resolve the sign of a velocity vector.

In accordance with another aspect of the invention, a method for determining the sign of the velocity vector uses auto-correlation to find the probability or likelihood that the direction of flow has a particular sign.

Auto-correlation of a double-exposed image, unlike cross-correlation between two images, produces a correlation function that is symmetric about zero. Thus, while it is possible to calculate the magnitude and the direction of the displacement of an object from one exposure to the next using auto-correlation, it is impossible to tell if the displacement between the images is in the positive or negative direction. In other words, it is impossible to establish the sign of the displacement using auto-correlation from a double-exposed image. By triple-exposing an image using unequal time differences between each exposure, however, it is possible to resolve this sign ambiguity. Auto-correlation of these images results in three different displacements between each of the three exposures. The result is a correlation function that is symmetric about zero similar to double exposed images but which has seven primary correlation peaks rather than the three that results from auto-correlation of double-exposed images. Despite this, it is still impossible to resolve the sign of the displacement using auto-correlation alone because although the displacements can be found from auto-correlation, the temporal order of the displacements cannot.

The sign ambiguity can be resolved by calculating the probability that the exposures occur in a specific temporal order, i.e., by assuming that the correlation has a specific sign and testing to see if the assumption is correct. To accomplish this, a correlation type analysis can be done with a priori knowledge of the peak correlation displacements determined from an auto-correlation analysis. If $(\Delta i_1,\Delta j_1)$, $(\Delta i_2,\Delta j_2)$, and $(\Delta i_3,\Delta j_3)$ represent the three, non-zero, primary displacements found from auto-correlation of a triple-exposed image where $|\Delta i_1|>|\Delta i_2|>|\Delta i_3|$ then, the order in which the exposures occurred that resulted in these displacements can be determined by comparing the function:

$$\eta_1 = 1 - \sum_{m=1}^{M}\sum_{n=1}^{N}\frac{[|I_{m+\Delta i_1,n+\Delta j_1} - I_{m+\Delta i_3,n+\Delta j_3}| + |I_{m,n} - I_{m+\Delta i_3,n+\Delta j_3}| - |I_{m,n} - I_{m+\Delta i_1,n+\Delta j_1}|]}{\phi^0_{\Delta i_1,\Delta j_1} + \phi^0_{\Delta i_3,\Delta j_3}}$$

with the function,

-continued $$\eta_2 = 1 - \sum_{m=1}^{M} \sum_{n=1}^{N} \frac{[|I_{m+\Delta i_2, n+\Delta j_2} - I_{m+\Delta i_3, n+\Delta j_3}| + |I_{m,n} - I_{m+\Delta i_3, n+\Delta j_3}| - |I_{m,n} - I_{m+\Delta i_2, n+\Delta j_2}|]}{\phi^0_{\Delta i_2, \Delta j_2} + \phi^0_{\Delta i_3, \Delta j_3}}$$

where $\phi^°_{\Delta i1, \Delta j1}$, $\phi^°_{\Delta i2, \Delta j2}$ and $\phi^°_{\Delta i3, \Delta j3}$ are the magnitudes of the three primary non-zero displacement error correlation peaks before normalization.

If $\eta_1$ is larger than $\eta_2$, then the first correlation peak occurs before the second. If $\eta_2$ is larger than $\eta_1$, then the second correlation peak occurs before the first relative to the direction in which the three correlation peaks are chosen, i.e., the assumed sign of the correlation.

These functions can be calculated very quickly since only pixels with intensity values above the threshold need to be considered in the calculation. Thus, in the sparse image array, the location of a pixel entry can be found that is above the threshold and then, from the original image array, the values of the pixel intensities at a specific displacement away from these locations can be determined. Note that $\eta_1$ and $\eta_2$ are defined in the same manner that the error correlation function discussed above is defined. Alternatively, $\eta_1$ and $\eta_2$ can also be defined using a statistical correlation relationship.

As a simple example to illustrate this technique, consider an image, as shown in FIG. 5, that consists of three pixels with intensities I=1.0 spaced a distance ($\Delta i, \Delta j$)=(3,3), (6,6) and (8,8) apart with the rest of the pixels in the image having intensities I=0.

Figure 8:
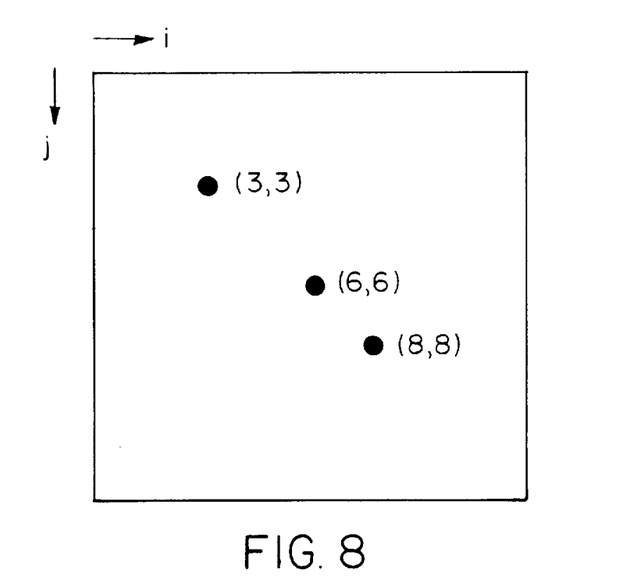
FIG. 8 is a simplified representation of a triple-exposed image having unequal time differences between each exposure.

An auto-correlation of this image using the error correlation function yields ($\Delta i_1, \Delta j_1$)=(2,2), ($\Delta i_2, \Delta j_2$)=(3,3), and ($\Delta i_3, \Delta j_3$)=(5,5) in the positive i,j direction relative to the zero displacement correlation. From the auto-correlation of this image, it is impossible to tell how the exposures are ordered when viewed from the upper left corner of the image to the lower right corner. The non-normalized correlation values $\phi^°_{\Delta i1, \Delta j1}$, $\phi^°_{\Delta i2, \Delta j2}$ and $\phi^°_{\Delta i3, \Delta j3}$ for these peaks are all equal to 2.0. The value of $\eta_1$ for this image is then equal to 0 and the value of $\eta_2$ is equal to 1.0. Therefore, the image of FIG. 8 correlates with a larger displacement first, ($\Delta i_2, \Delta j_2$)=(3,3), and then a smaller displacement ($\Delta i_1, \Delta j_1$)=(2,2), when viewed in the direction from the upper left of the image to the lower right of the image.

Figure 9:
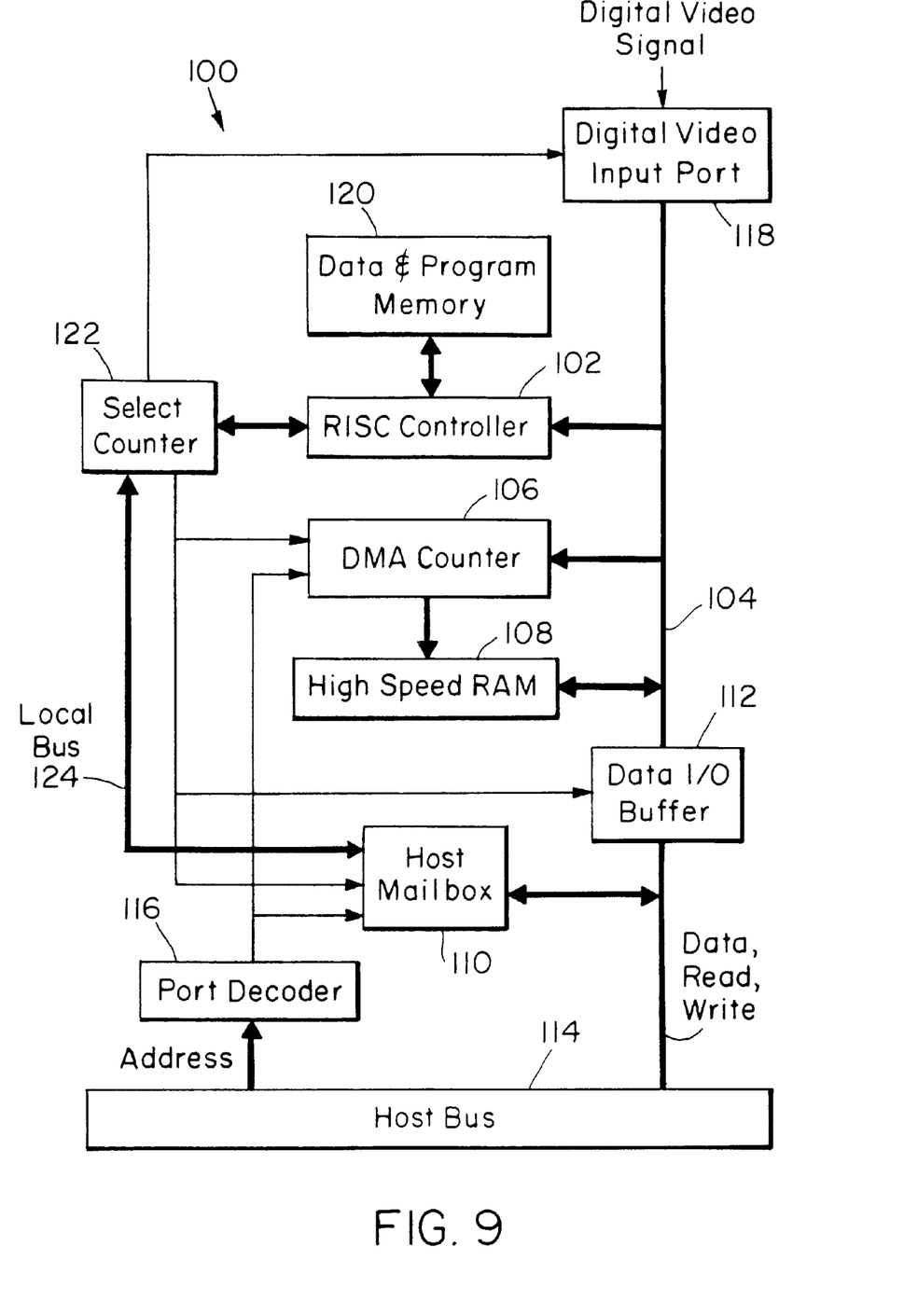
FIG. 9 is a schematic block diagram of a processor arrangement in accordance with the present invention.

Referring now to FIG. 9, a schematic block diagram of a processor arrangement for carrying out the present invention is shown. The processor arrangement, generally designated by reference number 100, is preferably a standard subprocessor card located in a general purpose computer. A RISC controller 102 is connected over a processor bus 104 to a variety of standard processor peripherals, including a Direct Memory Access (DMA) Counter 106, High Speed Random Access Memory (RAM) 108, a Host Mailbox 110, and a Data I/O Buffer 112. The Data Buffer 112 isolates the processor bus 104 from the host bus 114. A Port Decoder 116 decodes addressing for communication with other entities on the host bus 114. A Digital Video Input Port 118 connected to the processor bus 104 provides a digital video signal from a video peripheral such as a frame grabber card.

A Data and Program Memory 120 stores sparse array correlation processing code that is run by the RISC controller 102. The correlation processing code implements the process flow diagrams of FIGS. 3A and 3B. The results of the sparse array correlation process are also stored in the Data and Program Memory 120. The RISC Controller 102 uses a Select Counter 122 to select among the DMA Counter 106, Host Mailbox 110, Data I/O Buffer 112, and the Digital Video Input Port 118. The Host Mailbox 110 serves a memory function for communication with the RISC Controller 102, which can access the Host Mailbox 110 over a Local Bus 124.

In operation, a digital video signal containing a video image frame is received through Video Input Port 118 and downloaded into RAM 108 using DMA Counter 106. The RISC Controller 102 performs the sparse array correlation process on the downloaded video image using the code stored in Program Memory 120. Use of the DMA Counter 106 for downloading the next video image into RAM 108 allows the RISC Controller 102 to process at high speed the previous video image. To increase processing speed, it is preferably to have two such processor cards 100 operating in parallel and sharing memory such that while one card is processing the current video frame, the other card is downloading the next frame.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. For example, those skilled in the art will recognize that many modifications can be made to the processor arrangement 100 without departing from the scope of the present invention. Further, the novel functions of the present invention can be performed by embodiments implemented fully in nonprogrammable hardware designed specifically to perform the disclosed functions as well as fully implemented in a programmed general purpose computer.

What is claimed is:

1. A method of image correlation comprising the steps of providing at least an image array of pixel values, selecting pixel values in the image array which are beyond a pixel threshold value, creating a sparse image array of the selected pixel values and their respective locations in the image array, and performing an error correlation process on the selected pixel values in the sparse image array including cumulating correlations between pixel entries in a correlation table at respective distance entries.

2. The method of claim 1 further comprising the step of variable-length encoding the image pixel values prior to the selecting step.

3. The method of claim 2 wherein the step of variable-length encoding includes combining adjacent pixel values having the same most significant bit values into a single pixel value.

4. The method of claim 1 wherein the step of providing an image array includes an image array of at least three images spaced at unequal time intervals and further comprising the steps of identifying from the correlations possible relationships among the image array pixel values depending on direction and reviewing the image array pixel values to determine which relationship applies to yield the sign of direction.

5. The method of claim 1 wherein providing at least an image array of pixels includes recording a velocimetry image having a number of pixels; and forming the image array of pixel values from the velocimetry image.

6. The method of claim 5 wherein the velocimetry image is a Particle Image Velocimetry image.

7. The method of claim 5 wherein the velocimetry image is a Laser Speckle Velocimetry image.

8. The method of claim 5 wherein the velocimetry image is a Particle Tracking Velocimetry image.

9. A system for correlating a video image having a number of pixels comprising:

a memory for storing the video image;

a processor coupled to the memory to perform steps comprising:

retrieving the video image from memory;

forming an image array of pixel values, each pixel value associated with one of a number of pixels of the video image;

selecting pixel values in the image array which are beyond a pixel threshold value;

creating a sparse image array of the selected pixel values and their respective locations in the image array; and performing an error correlation process on the selected pixel values in the sparse image array including cumulating correlations between pixel entries in a correlation table at respective distance entries.

10. The system of claim 9 wherein the processor is further programmed to variable-length encode the image pixels prior to selection of pixel values.

11. The system of claim 10 wherein the variable-length encoding includes combining adjacent pixels having the same most significant bit values into a single pixel value.

* * * * *